(No Model.)
L. MILLER.
ENDLESS CARRIER APRON.
No. 386,551. Patented July 24, 1888.
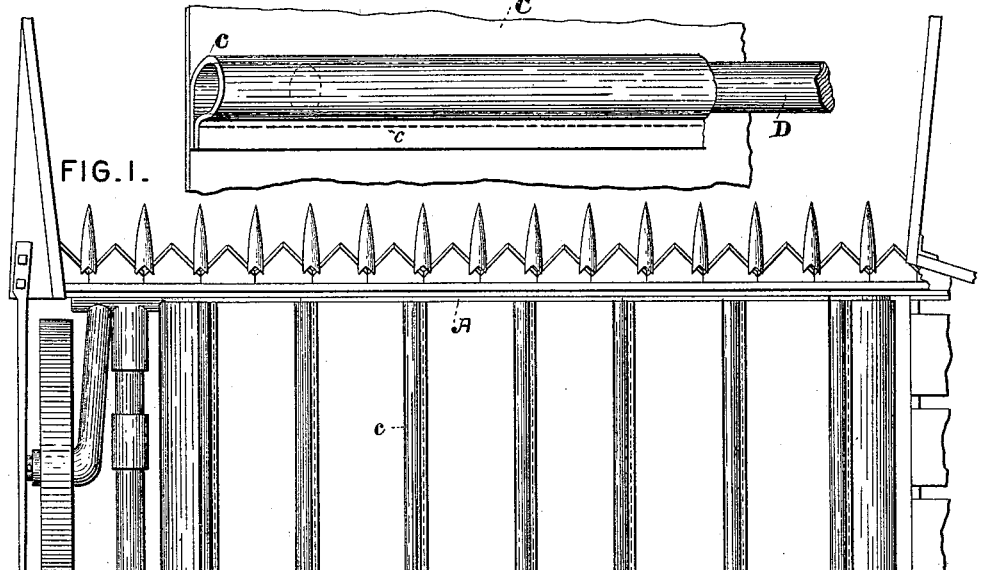
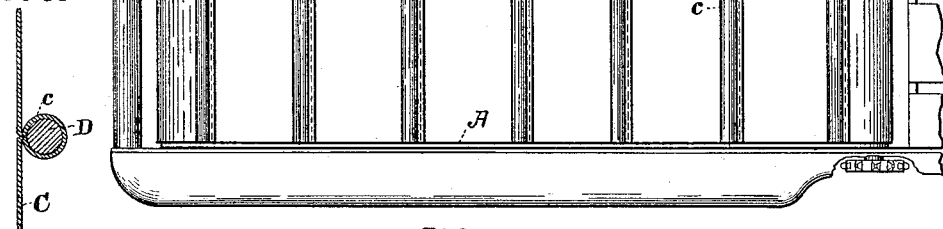
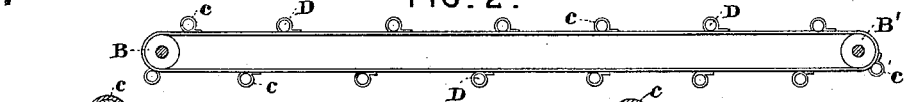
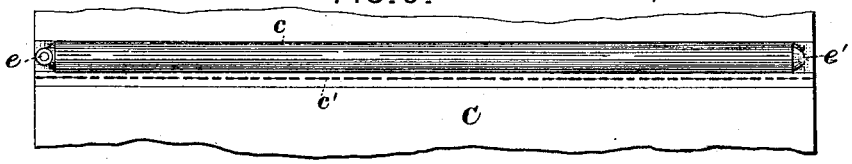
WITNESSES
Geo. T. Smallwood
Rex Smith
INVENTOR,
Lewis Miller
by A. M. Smith,
Attorney.

UNITED STATES PATENT OFFICE.

LEWIS MILLER, OF AKRON, OHIO.

ENDLESS CARRIER-APRON.

SPECIFICATION forming part of Letters Patent No. 386,551, dated July 24, 1888.

Application filed February 21, 1887. Serial No. 228,455. (No model.)

*To all whom it may concern:*

Be it known that I, LEWIS MILLER, of Akron, county of Summit, and State of Ohio, have invented a new and useful Improvement in Endless Carrier-Aprons, of which the following is a full, clear, and exact description, reference being had to the accompanying drawings, making part of this specification.

My invention relates to the manner of securing the slats to endless carrier aprons or canvas; and it has for its object to prevent the straw or other material operated upon from getting in between the slats or rods and the canvas, and so held and carried back by the canvas through the inoperative or return part of its path.

It consists in inclosing the rods or slats in loops of canvas or cloth formed either in the carrier-apron itself or in strips separate therefrom, and sewed or otherwise closely united to the carrier-apron, as hereinafter explained.

In the accompanying drawings, Figure 1 is a plan view of my improved carrier applied as the platform-carrier of a harvesting-machine; Fig. 2, a vertical longitudinal section through said carrier; Figs. 3 and 3ª, sections through one of the rods or slats and the portions of canvas to which they are attached; Fig. 4, a perspective view of a portion of the canvas and one of the rods; Fig. 5, a plan view showing the manner of inclosing the ends of the rod, and Fig. 6 a section showing the rod-covering loop formed in the cloth of the carrier itself.

The frame-work of the carrier may be of any usual or preferred construction, and it will therefore be unnecessary to describe it further than to say that A A indicate the longitudinal frame-bars of the carrier, and B B' the carrier-rollers suitably journaled in bearings in or attached to said bars.

C is the endless apron or carrier passing around said rollers and formed of canvas or other suitable material for the purpose, and D are the rods or slats secured thereto for insuring the proper movement of the straw with the carrier and preventing its slipping thereon. These rods or slats, instead of being riveted or clamped to the canvas in the usual manner, and which in practice is found to allow the straw or other material operated upon to get wedged in between the slats and the canvas in the intervals between the fastening devices, and so to interfere with the proper delivery or discharge of the material by the carrier, are inclosed in a strip or loop, c, of canvas, and the lapped ends of the strip or loop snugly embracing the rod are firmly secured to each other and to the body of the canvas by being closely stitched or sewed to the latter, as indicated at c' in Figs. 3, 4, and 5. By thus securing the rods or slats to the canvas they are firmly and closely united thereto throughout their entire length, and straw is effectually prevented from wedging in between the slats and apron, and from being caught and held thereby. The lapped ends of the strip may be turned either forward in the direction of the movement of the canvas, as shown in Fig. 3, or rearward relative to such direction of movement, as shown in Fig. 3ª, as preferred.

Instead of forming the loops separate from and uniting them to the canvas, as above described, they may be formed in the material of the carrier itself, as shown in Fig. 6, in which the canvas is shown wrapped directly around the rod or slat; or a loop of the required size is formed directly in the canvas for the reception of the rod or slat. The rods or slats may be made somewhat shorter than the width of the carrier-apron, and the ends of the loops projecting beyond the ends of the slats may be gathered and united to the body of the carrier by means of a rivet, as indicated at e, Fig. 5; or such gathered end may be stitched to the body of the carrier, as indicated at e' in the same figure. This manner of securing the ends of the loops prevents accidental displacement of the slats and obviates the necessity of making the loops to grasp the slats as tightly as would otherwise be required, and enables me to first form the loops of uniform size and then to insert the slats therein.

Having now described my invention, what I claim as new, and desire to secure by Letters Patent, is—

1. A carrier apron or canvas provided with stitched loops, in combination with rods or strips incased throughout their length within said loops, substantially as described.

2. In a belt or canvas carrier, a strip or rod incased throughout its entire length directly by the cloth of said belt, as shown and described.

3. A canvas carrier provided with stitched loops having closed ends, in combination with rods or strips incased throughout their length in said loops, substantially as and for the purpose described.

In testimony whereof I have hereunto set my hand this 18th day of February, A. D. 1887.

LEWIS MILLER.

Witnesses:
O. L. SADLER,
W. K. MEANS.